United States Patent [19]

Getman

[11] Patent Number: 4,643,905

[45] Date of Patent: Feb. 17, 1987

[54] METHOD FOR PRODUCING FROZEN CONFECTIONS INCLUDING EDIBLE PARTICULATE MATERIAL

[75] Inventor: Harlan R. Getman, Toledo, Ohio

[73] Assignee: Vroman Foods, Inc., Toledo, Ohio

[21] Appl. No.: 608,887

[22] Filed: May 10, 1984

[51] Int. Cl.$^4$ ............................................. A23G 9/00
[52] U.S. Cl. ................................. 426/565; 426/660; 99/494
[58] Field of Search .................. 426/565, 658, 660; 99/494; 118/20, 24, 25, 16

[56] References Cited

U.S. PATENT DOCUMENTS

| | | | |
|---|---|---|---|
| 1,949,835 | 3/1934 | James et al. | 426/289 |
| 2,684,869 | 7/1954 | Lapple . | |
| 2,995,107 | 8/1961 | Archer | 118/25 X |
| 3,228,357 | 1/1966 | Brusehke et al. | 426/293 X |
| 3,380,780 | 4/1968 | Allen et al. . | |
| 4,009,912 | 3/1977 | Mraz . | |
| 4,045,584 | 8/1977 | Jones et al. | 118/24 |
| 4,100,304 | 7/1978 | Getman | 426/565 |
| 4,131,080 | 12/1978 | Hughes | 118/505 X |
| 4,185,942 | 1/1980 | Bazan . | |
| 4,188,768 | 2/1980 | Getman | 426/306 |
| 4,189,289 | 2/1980 | Getman | 425/93 |
| 4,209,288 | 6/1980 | Tumey et al. | 426/565 |
| 4,264,634 | 4/1981 | Hochandel et al. | 426/293 |

*Primary Examiner*—R. B. Penland
*Attorney, Agent, or Firm*—John A. O'Toole

[57] ABSTRACT

A method of and apparatus for producing frozen confections includes a mixing head which accepts one or more flows of semi-frozen or viscous confection materials and combines them into a single flow, a slicing mechanism which transversely severs the flowing confections into individual products or bodies. Next, edible particulate matter is adhered to the upper surfaces of such products by an assembly having a vibratory portion dispenser and an air jet transfer and adhering assembly which is synchronized to the motion of a product conveyor. The confectionary bodies are then advanced into a refrigerated region where they chill and solidify. Finally, the chilled confectionary bodies are subjected to a chocolate spray or bath which is allowed to congeal and the products are then ready for packaging and are moved to a packaging area.

14 Claims, 5 Drawing Figures

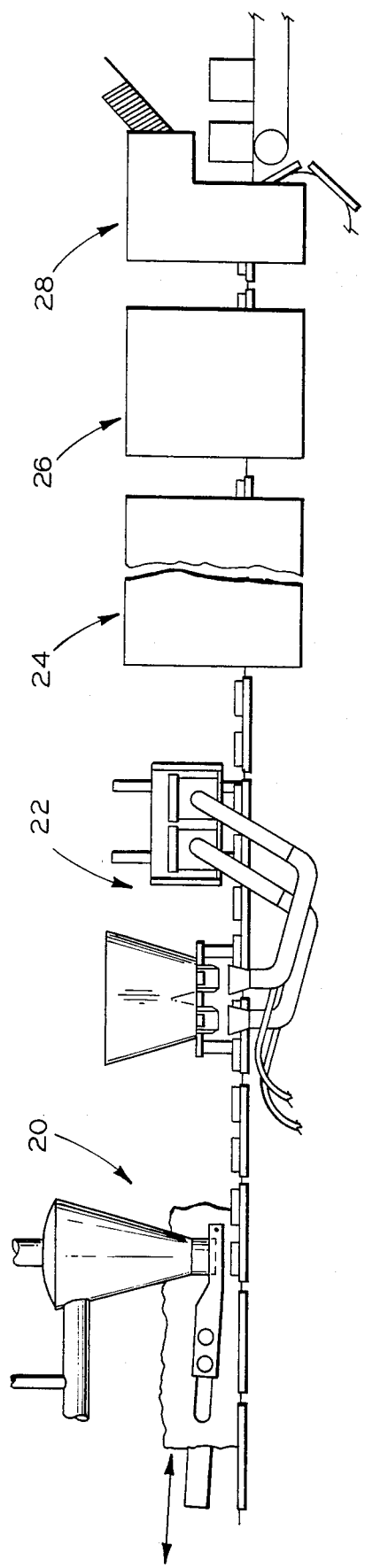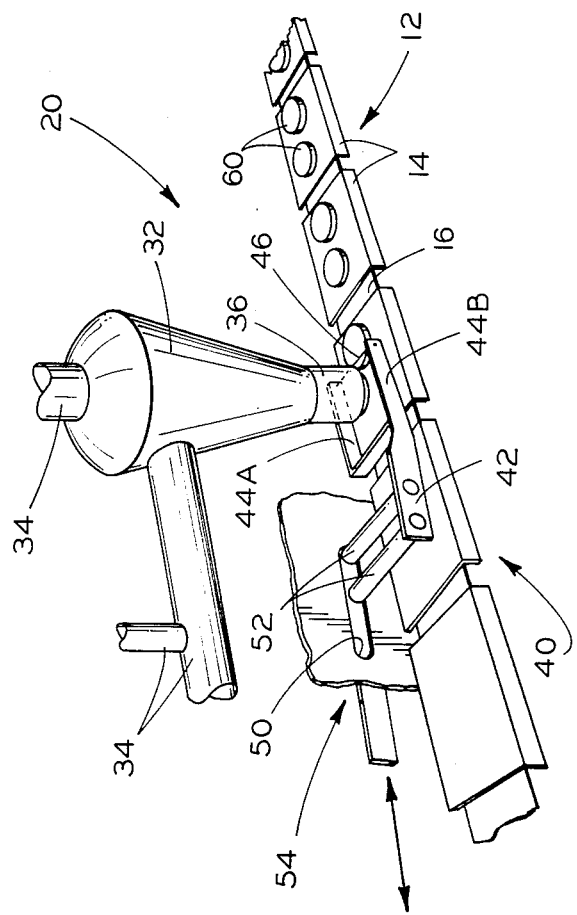
FIG. 1
FIG. 2

METHOD FOR PRODUCING FROZEN CONFECTIONS INCLUDING EDIBLE PARTICULATE MATERIAL

The invention relates generally to a method and apparatus for producing frozen confections and more particularly to a method and apparatus for producing a frozen confection having edible particulate matter disposed upon a frozen confectionary base and enrobed in a coating such as chocolate.

Lines for the automated production of frozen confections take many forms and provide many and varied functions depending upon the complexity and configuration of the confection. Broadly, a flow of semi-frozen viscous product such as ice cream, ice milk, or other sweetened dairy mixture is formed into an appropriate base configuration, the flow is cut or separated into individual product bodies. Finally, additional layers, particulate matter and/or coatings are applied. Preferably, such operations are performed in a continuous manner on a machine assembly typically utilizing a conveyor for the transfer of the product in its various states from one method step performing station to another.

One such process is illustrated in my co-owned U.S. Pat. No. 4,188,768. Here, an apparatus is disclosed wherein a comestible cone receives a chocolate layer on its inner surface through an atomizing process, a comestible ingredient such as ice cream, ice milk, sherbert, or the like is delivered into the chocolate coated interior of the cone and edible particulate material such as chopped nuts or the like is applied to the comestible ingredient disposed within the cone. The device disclosed therein for applying the particulate material generally comprehends a metering and delivery device disposed generally above the moving conveyor and spaced several inches from the tops of the confectionary product. So disposed, a certain small portion of the particulate material may not be applied to the product but may fall to the conveyor segments, slowly building up thereupon. Such material represents a problem not only from a maintenance standpoint but also from a cost standpoint since such lost material generally cannot be reused. Furthermore, since such edible material, oftentimes nuts, is relatively costly, even a small percentage loss of this material is significant.

Another similar production line is illustrated in my co-owned U.S. Pat. No. 4,189,289. Here, frozen bodies or disks of a confection such as ice cream, ice milk, or other edible material disposed on sticks are advanced successively through a chocolate coating spray, the chocolate coating is allowed to cool and congeal and then is rapidly and superficially softened by the application of heat in order to render it tacky such that edible particulate material such as chopped nuts and the like may be adhered to the chocolate coated confection. In this production line assembly, such edible particulate matter is supplied to a chamber through which the chocolate covered confections pass and which includes a pair of rapidly spinning vanes or rotors which agitate and propel the supply of particulate matter within the chamber at sufficient velocities that impact with the chocolate coating secures them thereto. Since the chamber of necessity includes entrance and exit openings (for the confections), a certain portion of the relatively randomly propelled particulate matter will escape from the chamber without adhering to the confections. In this instance such lost particulate matter can generally be resupplied to the chamber, if desired. The foregoing discussion reveals that improvements in confectionary production lines especially in those apparatuses and processes which relate to the application of particulate matter are both possible and desirable.

SUMMARY OF THE INVENTION

The instant invention is directed to a method of and apparatus for producing frozen confections consisting of a base of ice cream, ice milk, or other edible material having particulate matter disposed thereon and the base portion and particulate matter enrobed in a coating such as chocolate. The apparatus includes a mixing head which receives one or more flows of semi-frozen, viscous dairy products such as ice cream, ice milk, or other edible material such as semi-liquid marshmallow or caramel and combines them into a single flow. A slicing mechanism which transversely severs the flow of the confection reciprocates in timed relation to the lateral motion of an associated conveyor having segments which receive the severed individual bodies of confection. The linear speed of the downward flow of the confectionary material is, of course, adjusted relative to the conveyor speed (and slicing mechanism) such that a desired thickness of product is achieved. Next, an assembly having vibratory portion dispensing means and an air jet delivery and adhering assembly which is synchronized to the motion of the bodies on the conveyor provides accurately measured portions of edible particulate material such as nuts and the like. This material is applied uniformly as to quantity and dispersion and without loss. A refrigerated zone then receives the bodies and chills and solidifies them. Finally, a spray or bath of chocolate or similar material is disposed to receive the chilled confections and provides a coating of chocolate to the bodies which cools and congeals rapidly due to the reduced temperatures of the bodies. Finally, the completed completed are provided to a packing area where they are suitable packaged and boxed.

Thus it is an object of the instant invention to provide a method for producing a frozen confection consisting of a base portion of one or more constituents, edible particulate matter disposed thereupon, and a coating surrounding such base portion and particulate matter.

It is a further object of the instant invention to provide an apparatus for producing a frozen confection having a base portion, particulate matter disposed thereupon, and a coating surrounding such base portion and particulate matter.

It is a still further object of the instant invention to provide an apparatus for the production of a confection having an assembly for applying particulate matter which accurately measures the quantity of the particulate matter applied.

It is a still further object of the instant invention to provide an apparatus for the production of a confection having an assembly for applying particulate matter which accurately measures the quantity of the particulate matter applied and which substantially eliminates waste of such material.

Further objects and advantages of the instant invention will become apparent by reference to the following description of the preferred embodiment and appended drawings.

BRIEF DESCRIPTION OF THE DRAWINGS

FIG. 1 is a diagrammatic view in side elevation of an apparatus for producing bodies of frozen confection according to the instant invention;

FIG. 2 is a fragmentary, perspective view of a first station assembly of an apparatus for producing bodies of frozen confection according to the instant invention;

DESCRIPTION OF THE PREFERRED EMBODIMENT

Figure 3:
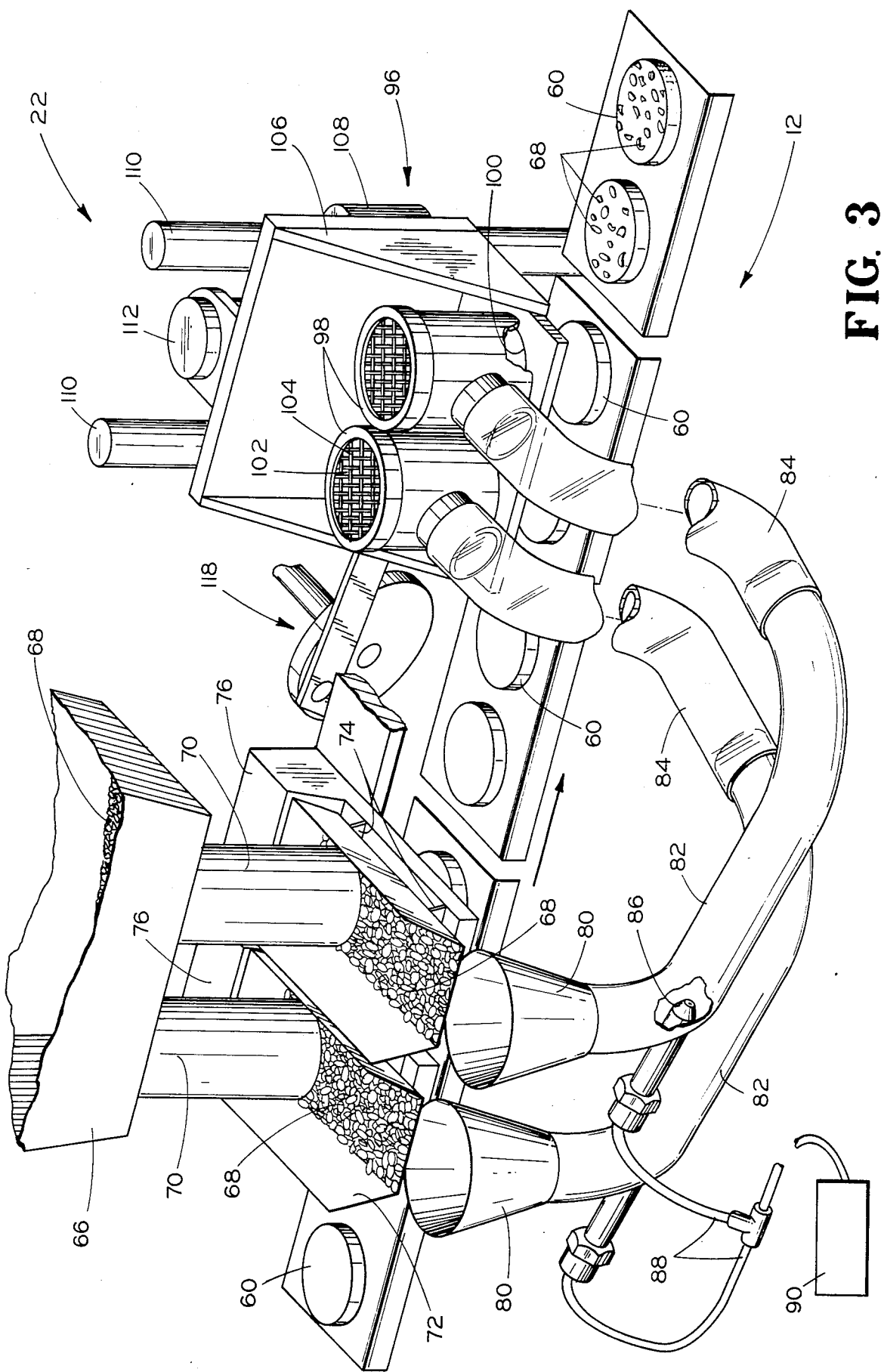
FIG. 3 is an enlarged perspective view of a second, particulate applying station assembly of an apparatus for producing bodies of frozen confection according to the instant invention.

Referring now to FIG. 1, an apparatus for the production of bodies of frozen confection is illustrated and generally designated by the reference numeral 10. The apparatus 10 comprehends a plurality of stations or assemblies spaced along portions of a continuous conveyor assembly 12 having a plurality of relatively small, preferably rectangular pallets 14 interconnected by suitable, pivotable or flexible links 16. The conveyor assembly 12 and particularly the pallets 14 are circulated on a suitable support or track (not illustrated) by conventional means such as a motor and speed reducing unit (both not illustrated). The stations include a confection mixing and forming station assembly 20, an edible particulate matter measurement and application station assembly 22, a refrigeration region 24, a coating station assembly 26 and, optionally, a packaging region 28. The various station assemblies of the apparatus 10 will now be described individually in the foregoing sequence.

Referring now to FIG. 2, the mixing and forming station assembly 20 generally includes a frusto-conical mixing head 32 which receives one, or more typically, a plurality of flows of confectionary constituents such as various flavor of ice cream, or caramel or marshmallow in a semi-fluid state through the conduits 34. The various flows of confectionary material are mixed in accordance with various procedures within the mixing head 32 and may define distinct, uniform regions as they exit an output nozzle 36 or may be swirled or mixed as desired. At the nozzle 36, the confectionary material is formed into a continuous stream having a desired profile, typically circular, and flows uniformly from the mixing head 32.

The mixing and forming station assembly 20 further includes a slicing mechanism 40. The slicing mechanism 40 includes a reciprocating carrier arm 42 having a pair of spaced apart ends 44A and 44B between which extends a cutting wire 46. The reciprocating carrier arm 42 is constrained to reciprocate along a path substantially parallel to the travel of the conveyor pallets 14 but at a slight angle which lowers the position of the cutting wire 46 as it traverses with the conveyor pallets 14. The downward motion of the cutting wire 46 corresponds on a per cycle basis to the downward flow of the confectionary material exiting the nozzle 36. Such movement may be achieved by a constraining structure such as the obliquely oriented slot 50 which cooperates with supports 52 of the carrier arm 42 and a reciprocating drive assembly 54 such as a rotating wheel and crank arm illustrated. In the arrangement illustrated, the reciprocating drive assembly 54 is timed to operate with the longitudinal movement of the conveyor pallets 14 as well as the downward flow of the confectionary material such that it cuts or slices two confectionary bodies 60 per conveyor pallet 14. The cutting wire 46 thus uniformly slices the flow exiting the nozzle 36 into substantially right circular cylinders as the confectionary bodies 60 are illustrated. It should be understood that no particular significance should be ascribed to the relationship between numbers of confectionary bodies 60 on each individual pallet 14 inasmuch as such ratios are primarily matters of design choice relating to pallet size, product size, conveyor speed confectionary material flow rate, etc. as those familiar with such processes will readily appreciate.

Referring now to FIG. 3, the edible particulate matter measurement and application station assembly 22 will now be described. The station assembly 22 is disposed generally proximate the conveyor assembly 12. The edible particulate matter measurement and application station assembly 22 preferably includes a storage tank or chamber 66 having a volume sufficient to supply edible particulate matter 68 contained therein to the associated apparatus for an extended period of time. When empty or substantially so, the chamber 66 may be filled manually from bulk supplies of the particulate matter 68. The chamber 66 communicates with one and preferably a pair of exit conduits 70 which extend downwardly from the bottom of the chamber 66 and terminate slightly above a respective pair of inclined chutes 72. The vertical spacing between the lowermost portion of the conduits 70 and the inside bottom surfaces of the chutes 72 is such that the particulate matter 68 may not readily flow out of the conduits 70 but is sufficiently large, preferably slightly greater than the maximum dimension of any particulate matter 68, such that no particles will be trapped therebetween. The chutes 72 are secured to and supported by a subframe 74 which in turn is coupled to the output member of a mechanical vibrator 76. The vibrator 76 may be of any conventional design and is preferably electrically driven. When the vibrator 76 is activated, the vibratory motion of the chutes 72, combined with their inclined orientation, moves the particulate matter 68 from the end adjacent the conduit 70 to the open end of the chute 72. Intermittent activation of the vibrator 76 results in an accurate quantity of particulate matter advancing along and off the chutes 72. Thus, timed intermittent activation of the vibrator 76 effectively and repeatedly measures accurately controlled portions of the edible particulate matter 68 in relation to, for example, the motion of the conveyor assembly 12.

Disposed generally beneath and vertically aligned with the open ends of the chutes 72 are a respective pair of frusto-conical funnels 80 which receive the measured quantities of particulate matter 68. Each of the funnels 80 merges into a respective pair of delivery conduits 82. The delivery tubes 82 may be rigid though it is preferable that they also include flexible portions 84 which may be rubber tubing, plastic tubing or tubing of a similar flexible material. Passing through the wall of each of the conduits 82 and disposed generally adjacent and below the funnels 80 in a region of the conduits 82 wherein the particulate matter 68 generally settles after having fallen through the funnels 80 and conduits 82 are air injection nozzles 86. As illustrated, the nozzles 86 are directed generally axially along the conduits 82, in a direction away from the funnels 80. The nozzles 86 are supplied with pulses of compressed air through suitable tubing 88 which are provided in appropriate timed relationship, for example, after the particulate matter 68 has fallen into the tubes 82 by an electropneumatic valve 90 which is cycled by a suitable timing pulse preferably related to or supplied by sensors associated with the conveyor assembly 12.

Figure 4A:
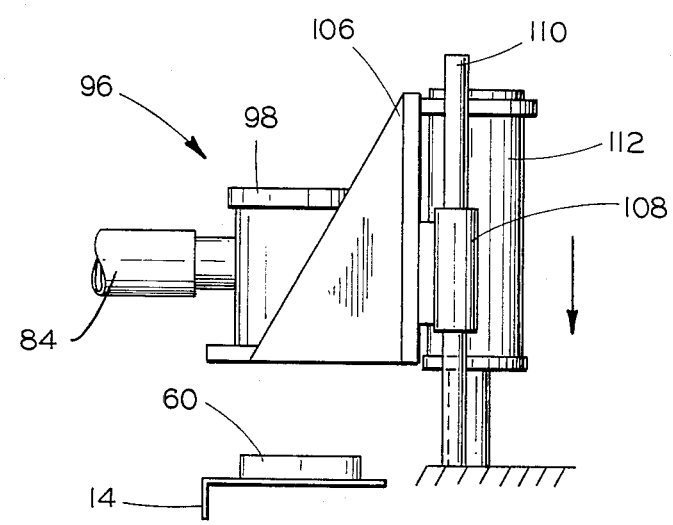
FIG. 4A is a diagrammatic side view of a portion of the particulate applying station assembly of an apparatus for producing bodies of frozen confection according to the instant invention.
Figure 4B:
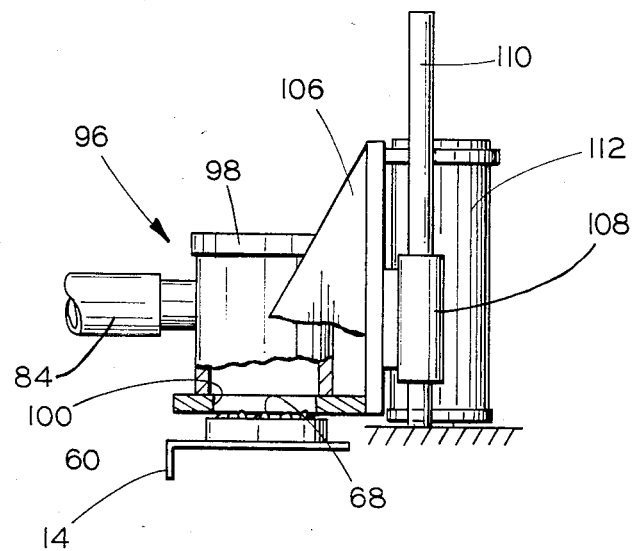
FIG. 4B is a diagrammatic side view of a portion of the particulate applying station assembly of an apparatus for producing bodies of frozen confection according to the instant invention.

Application of compressed air to the nozzles 86 and into the conduits 82 rapidly drives the edible particulate matter 68 along the conduits 82, through the flexible portions 84 and into an application assembly 96. Specifically, the particulate matter 68 enters into one of a pair of cylindrical chambers 98 having an open lower end 100 and an open upper end 102 having a screen or similar structure 104 disposed thereacross to prevent the escape of particulate matter 68 in an upward direction but which permits the ready escape of compressed air. The cylindrical chambers 98 are supported upon a vertically reciprocating subframe 106 by a pair of bushings 108 and suitably sized vertical guides 110, for example. Vertical motion may be imparted to the subframe 106 and associated components by a spring return or double acting pneumatic cylinder 112 which is illustrated in FIGS. 4A and 4B. The subframe 106 is also supported such that it may reciprocate longitudinally along the direction of and in a manner intermittently synchronous with the motion of the conveyor assembly 12. This is preferably accomplished by reciprocating the entire assembly 96 including the subframe 106 and pneumatic piston and cylinder assembly 112 by supporting it upon a common frame and driving it through, for example, an eccentric drive linkage 118. It should be appreciated that throughout the instant disclosure and particularly the above disclosure relating to the edible particulate matter measurement and application station assembly 22, elements of the apparatus are disclosed in pairs. Such pairing of components and thus attainment of a given operation twice during a single operating cycle is primarily a matter of design choice. It should therefore be understood that the components may be increased in number to 3, 4 or more, or just as readily reduced to a single component or element as desired. It should thus be appreciated that whereas certain components are disclosed as being utilized in pairs, it is exemplary and illustrative only and should not be considered as limiting to the disclosure of the instant invention.

The cycle of operation of the assembly 96 and the overall assembly 22 thus includes longitudinal motion in a direction opposite to that of the travel of the conveyor assembly 12 until the openings 100 are vertically aligned with a pair of the confectionary bodies 60 on one of the pallets 14 of the conveyor assembly 12 as generally illustrated in FIG. 4A. At this time, the eccentric drive linkage 118 reverses the direction of the assembly 96 and the subframe 106 such that it begins to synchronously follow one of the pallets 14 of the conveyor assembly 12. Next, the pneumatic piston and cylinder assembly 112 lowers the subframe 106 such that the openings 100 are disposed immediately above and preferably in contact with the upper surfaces of the confectionary bodies 60. Approximately simultaneous to this activity, the vibrator 76 is activated to dispense a measured portion of particulate matter 68 into the funnels 80 and conduits 82. While the chambers 98 and specifically the openings 100 are so disposed, the subframe 106 and the entire assembly 96 is traversing at a horizontal speed equal to that of the conveyor assembly 12 such that the adjacent, aligned relationship between the chambers 98 and confectionary bodies 60 is maintained. During this time, the electropneumatic valve 90 is activated providing a blast of air through the conduits 82 which carries the particulate matter 68 into the chambers 98 where it both falls by gravity and is driven randomly by the energy imparted to it by the compressed air onto the upper surfaces of the confectionary bodies 60, as illustrated in FIG. 4B. Excess air, of course, escapes through the screens 104 in the openings 102 in the upper portion of the chambers 98. A short interval later, the pneumatic piston and cylinder assembly 112 is activated such that the subframe 106 rises from its lowered position and the drive linkage 118 again moves the application assembly 96 in a direction opposite to that of the traverse of the conveyor assembly 12 such that an adjacent pallet 14 with its confectionary bodies 60 is engaged. The cycle then repeats.

Final steps of the process include moving the confectionary bodies 60 with the edible particulate matter 68 disposed thereupon through a refrigeration region 24 where they are fully solidified. Since the edible particulate matter 68 is applied to the bodies 60 when they are in a semi-solid state, the particulate matter 68 adheres readily and is then securely adhered by the hardening of the viscous material in the refrigeration region 24. Finally, a coating such as a chocolate coating may be applied to the confectionary bodies 60 according to a conventional process and the bodies 60 provided to a conventional packing region 26.

From the foregoing disclosure, it is apparent that use of the invention provides a method and apparatus for producing confectionary bodies having a base portion, particulate matter and a coating. Specifically, the instant invention relates to an apparatus and method for applying particulate matter wherein individually measured portions of a particulate matter are provided by intermittent activation of a mechanical vibrator connected to an open ended chute filled with such particulate matter supplied by a bulk supply. The size of each measured amount of particulate matter can be increased or decreased by increasing or decreasing the activation time of the vibrator or the amplitude of its vibration. The premeasured quantity of particulate matter drops by gravity into a feed conduit where it is driven by a properly timed pulse of compressed air into an application chamber which is intermittently positioned over the confectionary bodies. The bottom portion of the chamber is placed in sealing contact with the upper surface of the confection such that no spillage or loss of the particulate material is possible. Such contact and elimination of waste is a significant feature of the instant invention. The confectionary bodies may then be refrigerated and utimately coated with an external coating such as chocolate and appropriately packaged.

The foregoing disclosure is the best mode devised by the inventor for practicing the invention. It is apparent, however, that apparatus and methods incorporating modifications and variations will be obvious to one skilled in the art of fabrication of confections. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. A method of producing frozen confections comprising the steps of:
    severing a flow of confectionary material into individual bodies;
    positioning said individual bodies of confectionary material on a moving conveyor,
    dispensing a measured individual amount of edible particulate matter,
    providing a chamber having an open end and a vent,
    translating said open end of said chamber over one of said individual bodies in substantially sealing contact with said one of said individual bodies,
    maintaining said chamber in said substantially sealing contact with said one of said individual bodies on said moving conveyor while providing a flow of fluid for moving said individual measured amount of particulate matter into said chamber and onto said one of said individual bodies,
    venting said fluid to the atmosphere through said vent, and
    translating said chamber out of said substantially sealing contact with said one of said individual bodies.

2. The method of claim 1 wherein said fluid is air.

3. The method of claim 1 wherein said edible particulate matter is neasured by vibrating an open ended chute filled with said particulate matter for a predetermined time.

4. The method of claim 1 further including the steps of refrigerating said individual bodies and enrobing said individual bodies in a confectionary coating.

5. The method of claim 1 wherein said chamber is reciprocated vertically into and out of substantial contact with said individual bodies.

6. The method of claim 1 wherein said chamber is maintained over said individual bodies by moving it at the same speed as said conveyor.

7. The method of claim 1 wherein said chamber is reciprocated laterally at the same speed as said conveyor to maintain it over said individual bodies and returns to engage subsequent individual bodies.

8. A method of producing frozen confections comprising the steps of:
    serving a flow of confectionary material into individual bodies,
    positioning said individual bodies of confectionary material on a moving conveyor,
    dispensing a measured amount of edible particulate matter for an individual body into a delivery conduit,
    providing a chamber communicating with said delivery conduit and having at least one open end and a vent translating said open end of said chamber over one of said individual bodies in substantially sealing contact,
    maintaining said chamber in substantially sealing contact with said individual bodies on said moving conveyor by translating said chamber while providing a flow of fluid in said delivery conduit for moving said measured amount of edible particulate matter into said chamber and onto a respective individual body, and
    venting said fluid to the atmosphere through said vent,
    translating said chamber out of said substantially sealing contact with said one of said individual bodies.

9. The method of claim 8 wherein said fluid is air.

10. The method of claim 8 wherein said edible particulate matter is measured by vibrating and open ended chute filled with said particulate matter for a predetermined time.

11. The method of claim 8 further including the steps of refrigerating said individual bodies and enrobing said individual bodies in a confectionary coating.

12. The method of claim 8 wherein said chamber is reciprocated vertically into and out of substantial contact with said individual bodies.

13. The method of claim 8 wherein said chamber is maintained over said individual bodies by moving it at the same speed as said conveyor.

14. The method of claim 8 wherein said chamber is reciprocated laterally at the same speed as said conveyor to maintain it over said individual bodies and returns to engage subsequent individual bodies.

* * * * *